United States Patent [19]
Iwakiri

[11] Patent Number: 5,889,815
[45] Date of Patent: Mar. 30, 1999

[54] SPREAD SPECTRUM COMMUNICATION RECEIVER

[75] Inventor: Naohiko Iwakiri, Tokyo, Japan

[73] Assignee: YRP Mobile Telecommunications Key Technology Research Laboratories Co., Ltd., Japan

[21] Appl. No.: 812,840

[22] Filed: Mar. 6, 1997

[30] Foreign Application Priority Data

Mar. 8, 1996 [JP] Japan .................................. 8-080712

[51] Int. Cl.⁶ .......................... H04B 15/00; H04B 7/216; H04L 1/02
[52] U.S. Cl. .......................... 375/205; 375/208; 375/349; 370/342
[58] Field of Search .................................. 375/200, 205, 375/208, 347, 349, 260, 267; 370/342; 455/132, 134, 137

[56] References Cited

U.S. PATENT DOCUMENTS

| | | | |
|---|---|---|---|
| 5,237,586 | 8/1993 | Bottomley | 375/200 |
| 5,361,276 | 11/1994 | Subramanian | 375/346 |
| 5,528,624 | 6/1996 | Kaku et al. | 375/206 |
| 5,691,974 | 11/1997 | Zehavi et al. | 370/203 |
| 5,757,767 | 5/1998 | Zehavi | 370/208 |
| 5,757,845 | 5/1998 | Fukawa et al. | 375/200 |
| 5,777,990 | 7/1998 | Zehavi et al. | 370/335 |
| 5,799,010 | 8/1998 | Lomp et al. | 375/208 |
| 5,812,542 | 9/1998 | Bruckert et al. | 375/207 |

FOREIGN PATENT DOCUMENTS

| | | | |
|---|---|---|---|
| 0642243 | 3/1995 | European Pat. Off. | H04J 13/00 |
| 5183534 | 7/1993 | Japan | H04J 13/00 |
| 5316072 | 11/1993 | Japan | H04J 13/00 |
| 5336070 | 12/1993 | Japan | H04J 13/00 |
| 9624206 | 8/1996 | WIPO | H04J 13/00 |

*Primary Examiner*—Temesghen Ghebretinsae
*Assistant Examiner*—Albert Park
*Attorney, Agent, or Firm*—Ladas & Parry

[57] ABSTRACT

A spread spectrum communication receiver includes a plurality of fingers each including a despreader part, an inverse-orthogonal conversion part and a demodulation part. A channel combining part combines demodulated symbols of the plurality of fingers. A control part controls the plurality of fingers on the basis of orthogonal channel allocation information and channel state information so that the fingers execute a RAKE process when the channel information indicates that data to be transmitted is allocated to one orthogonal channel at a transmitter and the fingers perform parallel demodulation processes then the channel information indicates that data to be transmitted is allocated to a plurality of orthogonal channels at the transmitter.

12 Claims, 11 Drawing Sheets

SPREAD SPECTRUM COMMUNICATION RECEIVER

BACKGROUND OF THE INVENTION

1. Field of the Invention

The present invention relates to radio communication systems, and more particularly to a radio communication system which employs the code division multiple access (CDMA). More specifically, the present invention is concerned with a spread spectrum communication receiver which receives spread spectrum signals transmitted by a transmitter in which data to be transmitted is code-division multiplexed using an orthogonal code and is spectrum-spread using the sequence of a PN code (spreading code).

2. Description of the Related Art

Generally, data to be transmitted over a plurality of channels is divided and multiplexed before transmission. Examples of the above procedure are the FDM (Frequency Division Multiplex) system, the TDM (Time Division Multiplex) system, and the CDM (Code Division Multiplex) system.

In the CDM system, channels are separately defined by performing an orthogonal conversion using respective orthogonal codes which are spread in the same time-frequency space. It is easily possible to determine and modify, for each channel, the data rate and weighting. For this reason, the CDM system is suitable for hierarchical transmission.

In the field of broadcasting, there has been considerable activity in the development of a digital video signal transmission system in which the channels defined by the CDM system are assigned different weighting values on the transmitter side and a graceful degradation process is carried out on the receiver side, In the graceful degradation process, the channels to be combined are selected according to qualities of the received signals.

In the field of mobile communications, the IS-95 system which is standardized as a CDMA cellular telephone system utilizing direct sequence (DC) spread spectrum is known. In the IS-95 system, a control channel and communication channels are defined by the CDM system. On the transmitter side, control information and speech information are assigned to channels defined by using the orthogonal codes and are then transmitted, On the receiver side, a RAKE process is carried out in which one channel is subjected to a demodulation process using a plurality of fingers (also referred to as branches). The RAKE process is directed to improving the quality of received signals.

A further description will be given of the rake receive process. The RAKE process is inherent in the spread spectrum communication system and enables path diversity reception.

In digital communications such as the spread spectrum communication system, a transmission wave arrives at the receiver, as a direct wave and reflected waves. That is, the receiver directly receives the transmission wave, and receives waves reflected by buildings or the like. Generally, there are many routes (multipath) in which the transmission wave is reflected and then arrives at the receiver. Hence, the receiver receives many signals which propagate along the different radio paths. Such a group of received signals propagated through different (isolated) paths can be called a received multipath signal. The received signals that arrive at the receiver via the different paths have different propagation delay times. Hence, the quality of received signals may decrease due to the interference caused by multipath.

The PN code allocated for the spectrum spreading process at the transmitter is also allocated in order to perform a spectrum despreading process at the receiver. If the PN code allocated at the receiver has a time offset to the received signals propagated along the paths, the cross-correlation will be destroyed. With the above in mind, the following process is employed at the receiver in order to avoid a decrease in the quality of the received signal due to the interference caused by multipath. A despreading part of the receiver gives the PN code a phase offset dependent on the propagation delay time. The despreading part despreads the received multipath signal and produces a despread signal of one path of the received multipath signal which has the propagation delay time corresponding to the given phase offset. That is, the received signals of the other paths of the received multipath signal do not be despread because of less correlation. In this manner, the PN codes are given the phase offsets for the respective received signals of the paths, which can be despread by the respective PN codes given the respective phase offsets. Hence, the received multipath signal can be despread for each isolated path.

Thus, the receiver is equipped with despreading parts provided in parallel. The despreading parts give the PN code the phase offsets corresponding to the propagation delay times of the respective paths. The PN codes thus obtained are allocated in order to despread the received multipath signal, so that the despread symbols can be separately obtained.

The received symbols thus obtained are respectively weighted and are combined at a combining part of the receiver, so that combined demodulated symbols having good quality can be obtained.

As described above, the RAKE process selectively demodulates the received multipath signal having the signals propagating along a plurality of paths, and then combines demodulated symbols. Thus, the RAKE process realizes the path diversity reception.

Generally, a fixed number of channels is allocated to each user in the above-mentioned digital video signal transmission system and the CDMA cellular telephone system. Thus, the demodulator of the receiver is designed to perform the demodulating operation on the given number of channels.

Recently, it has been required that the mobile communications be used to provide not only services directed to transferring speech and low-data-rate data but also advanced services directed to transferring data at a high data rate. Since the conventional system has the fixed number of channels for each user, it is necessary to increase the data rate per channel in order to meet the above requirement. However, in practice, an increase in the data rate is limited to a certain level, and thus the conventional spread spectrum communication system cannot sufficiently realize the high-data-rate data transfer.

Further, a particular attention should be drawn, in the mobile communications, to fading which affects the received multipath signal every moment and degrades the quality of received signal. Data may be lost by fading.

SUMMARY OF THE INVENTION

It is an object of the present invention to provide a spread spectrum communication receiver capable of realizing highly reliable services directed to transferring not only speech and low-data-rate data but also high-data-rate data.

The above objects of the present invention are achieved by a spread spectrum communication receiver comprising: a plurality of fingers each including a despreader part, an inverse-orthogonal conversion part and a symbol demodulation part; a channel combining part which combines respective demodulated symbols of the plurality of fingers; and a control part which controls the plurality of fingers on the basis of channel state information and orthogonal channel allocation information so that the fingers execute a RAKE process when the orthogonal channel allocation information indicates that data to be transmitted is allocated to one orthogonal channel at a transmitter and the fingers perform parallel demodulation processes when the orthogonal channel allocation information indicates that data to be transmitted is allocated to a plurality of orthogonal channels at the transmitter.

The spread spectrum communication receiver may be configured so that the control part controls the plurality of fingers so that the fingers simultaneously perform the RAKE process in addition to the parallel demodulation processes when the orthogonal channel allocation information indicates that data to be transmitted is allocated to a plurality of orthogonal channels at the transmitter.

The spread spectrum communication receiver may be configured so that the control part controls the plurality of fingers so that the orthogonal channels to be processed are dynamically allocated to the fingers on the basis of the orthogonal channel allocation information which indicates the number of orthogonal channels allocated at the transmitter and weighting for the orthogonal channels allocated at the transmitter.

The spread spectrum communication receiver may be configured so that the channel combiner combines the demodulated symbols of the fingers so that the demodulated symbols of the fingers obtained by the RAKE process are added to generate combined demodulated symbols, and the demodulated symbols of the fingers obtained by the parallel demodulation processes and the combined demodulated symbols obtained by the RAKE process are then combined in serial formation.

The spread spectrum communication receiver may be configured so that the channel combiner combines the demodulated symbols of the fingers so that the demodulated symbols of the fingers obtained by the RAKE process are adjusted on the basis of the channel state information so as to have an identical timing and are then added to generate the combined demodulated symbols.

The spread spectrum communication receiver may be configured so that: the plurality of fingers respectively have spreading code generators and orthogonal code generators; the spreading code generators respectively provided for despread parts of the fingers generate spreading codes with respective phase offsets dependent on the channel state information; and the orthogonal code generators respectively provided for the inverse-orthogonal conversion parts of the fingers generate a same orthogonal code as that allocated at the transmitter when the fingers perform the RAKE process and respective orthogonal codes when the fingers perform the parallel demodulation process.

The above objects of the present invention are also achieved by a spread spectrum communication receiver comprising: a plurality of fingers each including a despreader part, an inverse-orthogonal conversion part and a demodulation part; a channel combining part which combines demodulated symbols of the plurality of fingers; a memory which stores a despread signal obtained by despreading a signal propagated through a path having a greatest receive power level; and a control part which controls the memory and the plurality of fingers so that the despread signal is read from the memory and is applied to the plurality of fingers, which fingers perform parallel demodulation processes a plurality of times within a period of a spreading code applied to the despreader part, whereby all orthogonal channels allocated at a transmitter can be demodulated within the period of the spreading code.

The spread spectrum communication receiver may be configured so that the control part controls the memory and the plurality of fingers so that the fingers simultaneously perform the parallel demodulation processes on mutually different orthogonal channels.

The spread spectrum communication receiver may be configured so that the control part controls the memory so that the despread signal is repeatedly read from the memory a given number of times which enables all the orthogonal channels allocated at the transmitter to be demodulated within the period of the spreading code by the parallel demodulation processes.

The spread spectrum communication receiver may be configured so that the number of orthogonal channels allocated at the transmitter is greater than the number of the fingers.

The above objects of the present invention are also achieved by a spread spectrum communication receiver comprising: a memory which stores a received multipath signal; a plurality of fingers, coupled to the memory, each including a despreader part, an inverse-orthogonal conversion part and a demodulation part; a channel combining part which combines demodulated symbols of the plurality of fingers; and a control part which controls the memory and the plurality of fingers so that the multipath signal is read from the memory and is applied to the plurality of fingers, which fingers perform a RAKE process a plurality of times within a period of a spreading code applied to the despreader part, whereby all orthogonal channels allocated at a transmitter can be demodulated by the RAKE process within the period of the spreading code.

The spread spectrum communication receiver may be configured so that the control part controls the memory and the plurality of fingers so that the fingers perform the RAKE process on all the orthogonal channels allocated at the transmitter within the period of the spreading code.

BRIEF DESCRIPTION OF THE DRAWINGS

Other objects, features and advantages of the present invention will become more apparent from the following detailed description when read in conjunction with the accompanying drawings, in which.

DETAILED DESCRIPTION

Figure 1:
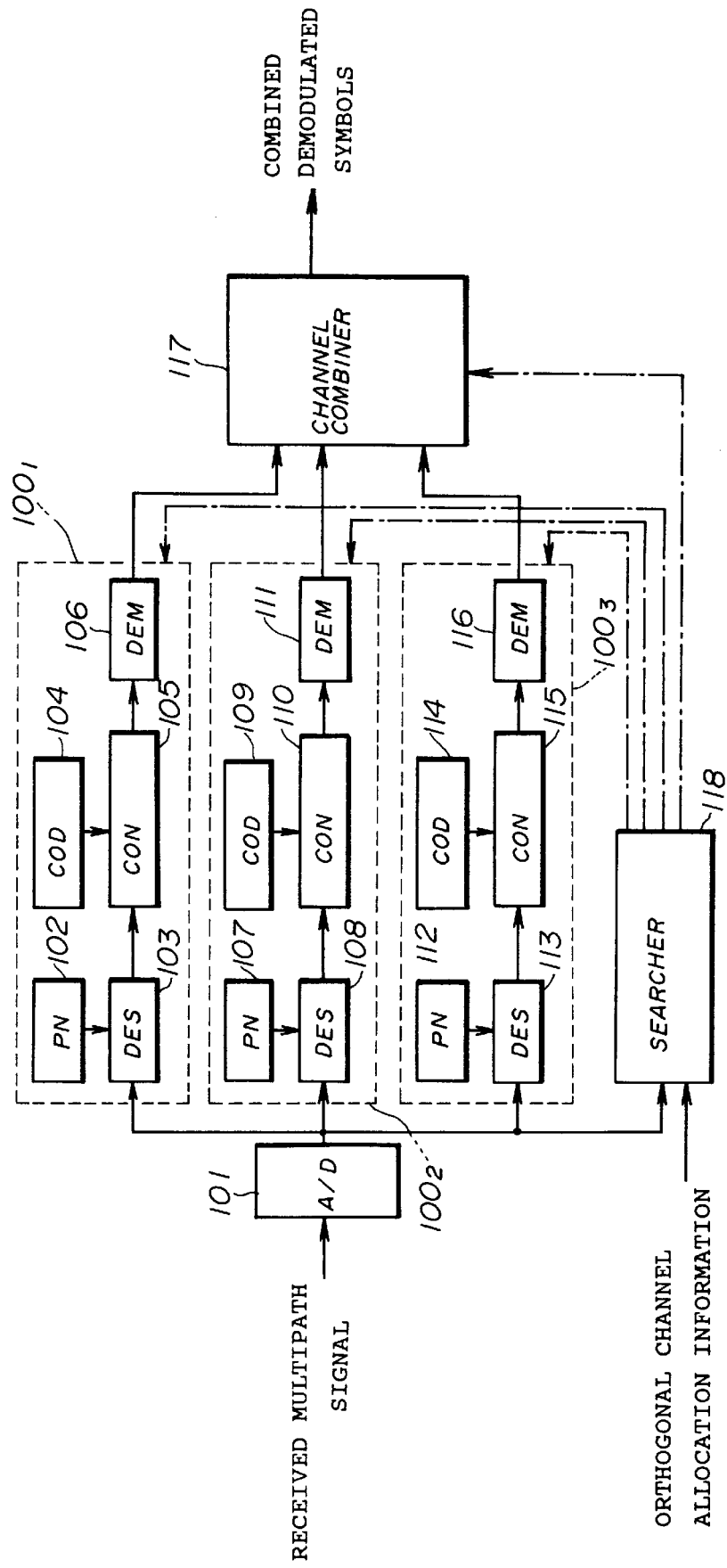
FIG. 1 is a block diagram of a spread spectrum communication receiver according to a first embodiment of the present invention.

FIG. 1 schematically shows a spread spectrum communication receiver according to a first embodiment of the present invention. The spread spectrum communication receiver shown in FIG. 1 has three fingers (branches) $100_1$, $100_2$ and $100_3$.

The first finger $100_1$ is made up of a PN generator (PN) 102, a despreader (DES) 103, an orthogonal code generator (COD) 104, an inverse-orthogonal converter (CON) 105, and a demodulator (DEM) 106. Similarly, the second finger $100_2$ is made up of a PN generator (PN) 107, a despreader (DES) 108, an orthogonal code generator (COD) 109, an inverse-orthogonal converter (CON) 110, and a demodulator (DEM) 111. similarly, the third finger 1003 is made up of a PN generator (PN) 112, a despreader (DES) 113, an orthogonal code generator (COD) 114, an inverse-orthogonal converter (CON) 115, and a demodulator (DEM) 116.

An A/D converter 101 is provided common to the first, second and third fingers $100_1$, $100_2$ and $100_3$. The A/D converter 101 follows an RF module (not shown), which converts the multipath signal received via an antenna (not shown) into an analog baseband signal. A transmitter (not shown) performs the direct sequence spread spectrum process and transmits the spread spectrum signal. The receiver receives the multipath signal of the transmitted signal, and the RF module converts the received multipath signal into an analog baseband signal. The A/D converter 101 converts the analog baseband signal into a digital signal, which will also be referred to as an RX signal hereinafter. The RX signal thus obtained is supplied to the fingers $100_1$ through $100_3$ and a searcher 118, which will be described in detail later.

The PN generator 102 of the first finger $100_1$ receives a phase offset directed to the first finger $100_1$ and indicated by the searcher 118. Then, the PN generator 102 generates a PN code having the informed phase offset. The despreader 103 despreads the RX signal from the A/D converter 101 by using the sequence of the PN code from the PN generator 102. The orthogonal code generator 104 receives the above phase offset and an orthogonal channel number directed to the first finger $100_1$ and indicated by the searcher 118. Then, the orthogonal code generator 104 generates an orthogonal code based on the phase offset and the orthogonal channel number. The inverse-orthogonal converter 105 performs an inverse-orthogonal converting operation on the despread signal (which will also be referred to as despread chips hereinafter) from the despreader 103 by using the orthogonal code output from the orthogonal code generator 104. The demodulator 106 demodulates the signal from the inverse-orthogonal converter 105 (the above signal will be referred to as despread orthogonal chips), and thus produces demodulated symbols.

The PN generator 107 of the second finger $100_2$ receives a phase offset directed to the second finger $100_2$ and indicated by the searcher 118. Then, the PN generator 107 generates a PN code having the informed phase offset. The despreader 108 despreads the RX signal from the A/D converter 101 by using the sequence of the PN code from the PN generator 107. The orthogonal code generator 109 receives the above phase offset and an orthogonal channel number directed to the second finger $100_2$ and indicated by the searcher 118. Then, the orthogonal code generator 109 generates an orthogonal code based on the phase offset and the orthogonal channel number. The inverse-orthogonal converter 110 performs an inverse-orthogonal converting operation on the despread chips from the despreader 108 by using the orthogonal code output from the orthogonal code generator 109. The demodulator 111 demodulates the despread orthogonal chips from the inverse-orthogonal converter 110 and thus produces demodulated symbols.

The PN generator 112 of the third finger $100_3$ receives a phase offset directed to the third finger $100_3$ and indicated by the searcher 118. Then, the PN generator 112 generates a PN code having the informed phase offset. The despreader 113 despreads the RX signal from the A/D converter 101 by using the sequence of the PN code from the PN generator 112. The orthogonal code generator 114 receives the above phase offset and an orthogonal channel number directed to the third finger $100_3$ and indicated by the searcher 118. Then, the orthogonal code generator 114 generates an orthogonal code based on the phase offset and the orthogonal channel number. The inverse-orthogonal converter 115 performs an inverse-orthogonal converting operation on the despread chips from the despreader 113 by using the orthogonal code output from the orthogonal code generator 114. The demodulator 116 demodulates the despread orthogonal chips from the inverse-orthogonal converter 115 and thus produces demodulated symbols.

A channel combiner 117 separately or simultaneously performs a first channel combining operation and a second channel combining operation. The first channel combining operation is carried out when the demodulated symbols from the demodulators 106, 111 and 116 should be weighted and combined by the RAKE process. The second channel combining operation is carried out when at least two orthogonal Channels should be separately demodulated (parallel demodulation). The first and second channel combining operations are simultaneously carried out when both the demodulation by the RAKE process and the parallel demodulation are simultaneously used. The first and second channel combining operations are carried out under control of the searcher 118, as will be described in detail later.

The searcher 118 measures the states of the channels (channel states) and allocates the phase offsets based on the measured channel states to the fingers $100_1$ through $100_3$ and the channel combiner 117. For example, the searcher 118 measures the phase offsets of the sequences of the PN codes determined by relative delay times of the isolated signals (waves) with respective propagation delay times, and measures the power levels of the isolated signals. Further, the searcher 118 allocates the orthogonal channel numbers determined by the orthogonal codes.

The spread spectrum communication receiver thus configured operates as follows. It will now be assumed that the transmitter transmits data by using one orthogonal channel. In this case, the receiver executes the RAKE process. The searcher 118 of the receiver measures the channel states, such as the phase offsets of the PN sequences and power levels of the incoming waves propagating along the different paths. Then, the searcher 118 supplies the fingers $100_1$ through $100_3$ and the channel combiner 117 with the phase offsets with respect to the three paths having the first to third greatest receive power levels.

Figure 4:
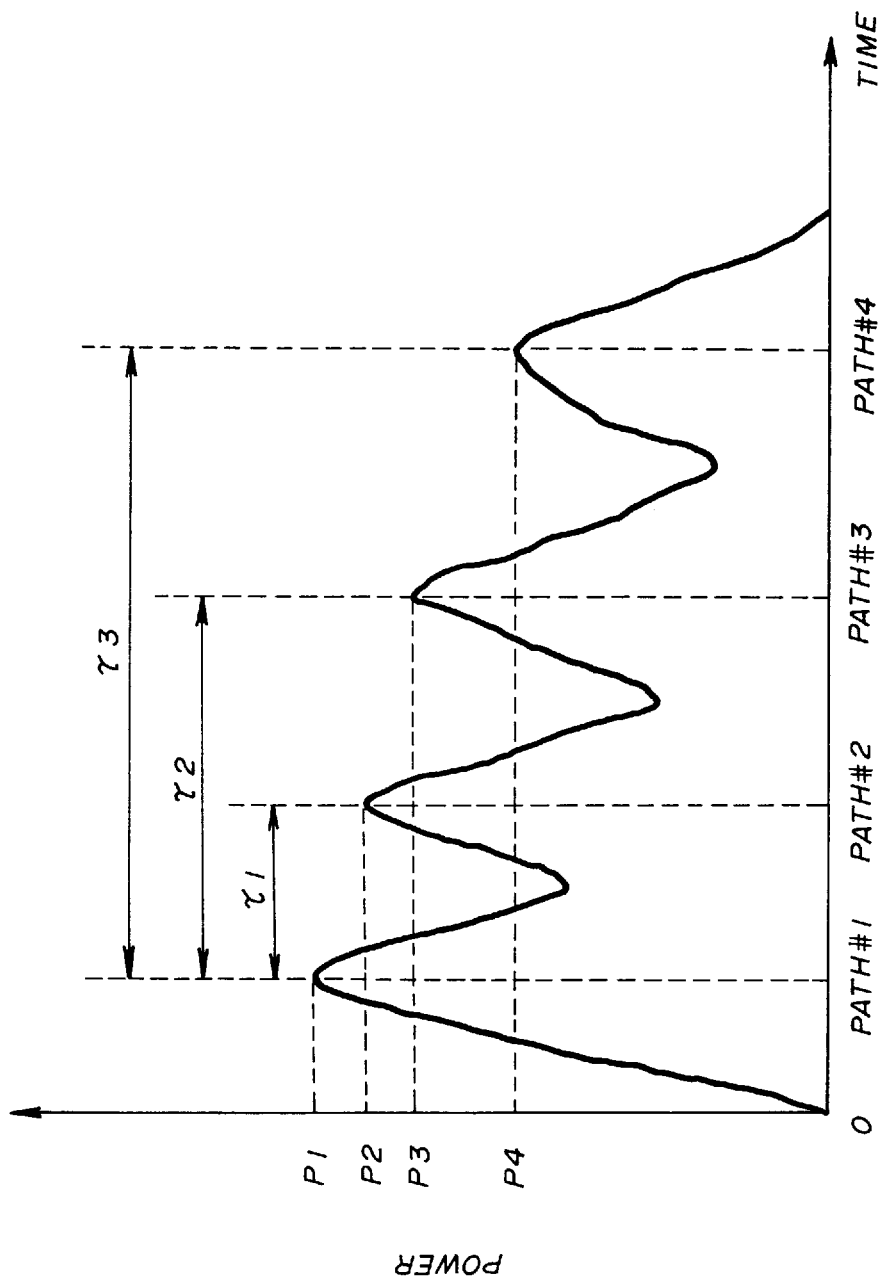
FIG. 4 is a graph of an example of a measurement result obtained by the searcher shown in FIG. 3.

FIG. 4 shows an example of the channel states measured by the searcher 118. The horizontal axis of the graph of FIG.

4 denotes time, and the vertical axis thereof denotes the receive power level. The example shown in FIG. 4 has four paths #1 through #4. The path #1 has a receive power level P1. The path #2 has a receive power level P2 and a relative delay time τ1. The path #3 has a receive power level P3 and a relative delay time τ2. The path #4 has a receive power level P4 and a relative delay time τ3.

The searcher 118 selects the three paths having the first to third greatest receive power levels from among the four paths #1–#4. In the example shown in FIG. 4, the searcher 118 selects the paths #1, #2 and #3. Then, the searcher 118 supplies. the finger $100_1$ with a first phase offset for the path #1 (the first phase offset is equal to 0) having the greatest receive power level, and supplies the finger $100_2$ with a second phase offset for the path #2 (the second phase offset is equal to τ1) having the second greatest receive power level. Further, the searcher 118 supplies the finger $100_3$ with a third phase offset for the path #3 (the third phase offset is equal to τ2) having the third greatest receive power level. Moreover, the searcher 118 informs the fingers $100_1$ through $100_3$ of the orthogonal channel number of the orthogonal channel allocated for the transmission. It will now be assumed that the orthogonal channel number allocated for the transmission is denoted as W1. The orthogonal channel number allocated for the transmission is given by the transmitter as orthogonal channel allocation information.

The PN generator 102 of the finger $100_1$ generates the PM code with the first phase offset dependent on the received signal of the path #1. The despreader 103 despreads the RX signal from the A/D converter 101 by the PN code generated by the PN generator 102. The orthogonal code generator 104 of the finger $100_1$ is informed of the orthogonal channel number W1, and generates the orthogonal code having the orthogonal channel number W1. The inverse-orthogonal converter 105 performs the inverse-orthogonal conversion process for the despread chips from the despreader 103 by using the orthogonal code supplied from the generator 104.

The PN generator 107 of the finger $100_2$ generates the PN code with the second phase offset dependent on the received signal of the path #2, The despreader 108 despreads the RX signal from the A/D converter 101 by the PN code generated by the PN generator 107. The orthogonal code generator 109 of the finger $100_2$ is informed of the orthogonal channel number W1, and generates the orthogonal code having the orthogonal channel number W1. The inverse-orthogonal converter 110 performs the inverse-orthogonal conversion process for the despread chips. from the despreader 108 by using the orthogonal code supplied from the generator 109.

The PN generator 112 of the finger $100_3$ generates the PN code with the third phase offset dependent on the received signal of the path #3. The despreader 113 despreads the RX signal from the A/D converter 101 by the PN code generated by the PN generator 112. The orthogonal code generator 114 of the finger $100_3$ is informed of the orthogonal channel number W1, and generates the orthogonal code having the orthogonal channel number W1. The inverse-orthogonal converter 115 performs the inverse-orthogonal conversion process for the despread chips from the despreader 113 by using the orthogonal code supplied from the generator 114.

The demodulators 106, 111 and 116 demodulate the despread orthogonal chips from the converters 105, 110 and 115, respectively. The demodulated symbols are supplied to the channel combiner 117, which performs a timing adjustment process based on the first through third phase offsets allocated to the respective paths #1 through #3. Thus, the demodulated symbols after the timing adjustment process have the same timing, and are combined together. The combined demodulated symbols are then subjected to an error correction process in an error correcting part (not shown in FIG. 1).

Figure 2:
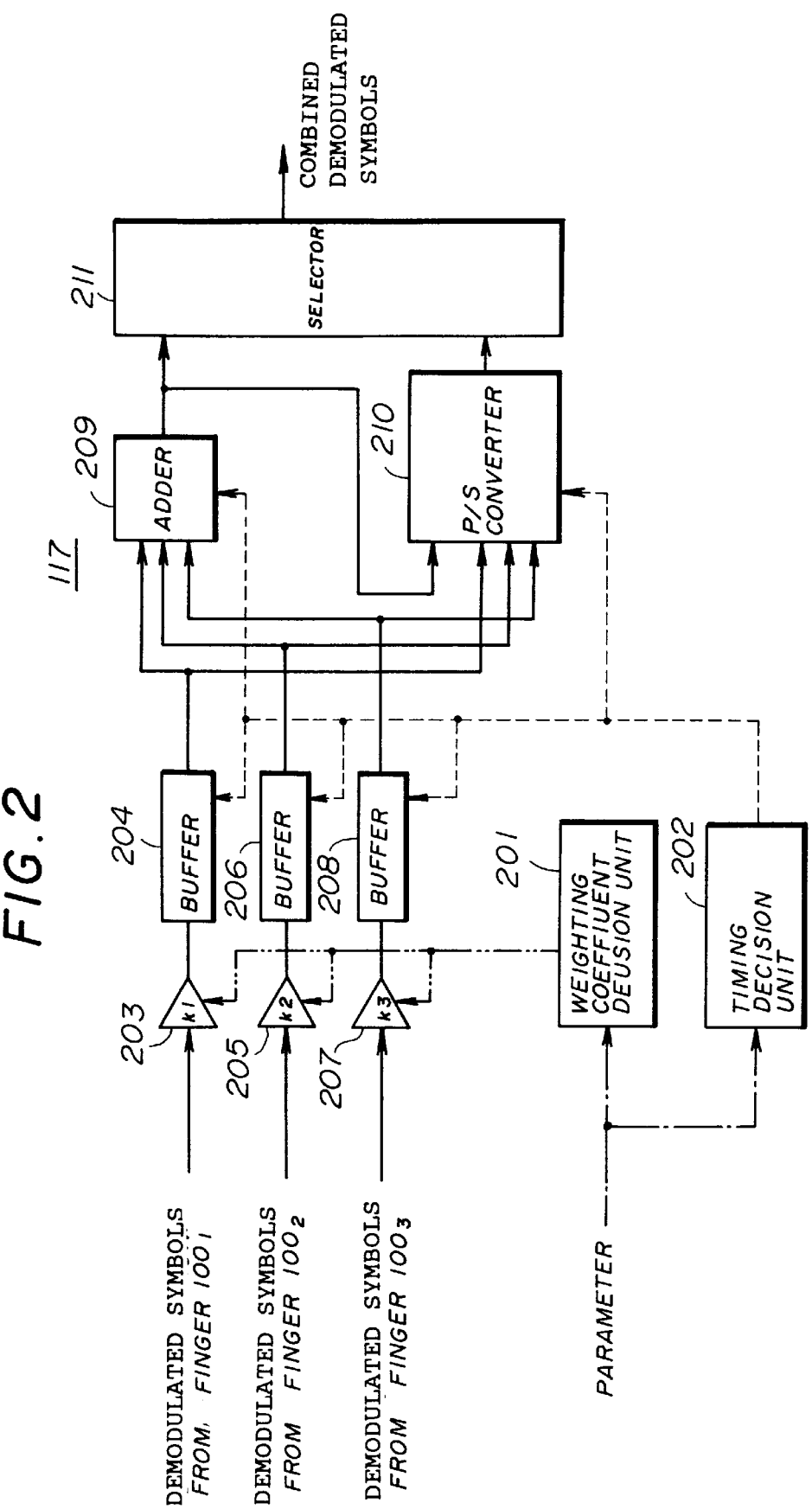
FIG. 2 is a block diagram of a channel combiner shown in FIG. 1.

FIG. 2 is a block diagram of the channel combiner 117 shown in FIG. 1. The channel combiner 117 includes a weighting coefficient decision unit 201, and a timing decision unit 202. The weighting coefficient decision unit 201 determines weighting coefficients k1, k2 and k3 for the isolated signals of the paths allocated to the fingers $100_1$ through $100_3$ on the basis of the receive power levels of the paths. For example, the isolated signal of the path having a relatively low receive power level is assigned a relatively small value of the weighting coefficient. The timing decision unit 202 determines a timing for the symbol combining process on the basis of the differences between the relative delay times allocated to the fingers $100_1$ through $100_3$ and given by the searcher 118.

The channel combiner 117 further includes gain multipliers 203, 205, 207, and buffers 204, 206 and 208. The gain multiplier 203 multiplies the demodulated symbols from the finger $100_1$ by the weighting coefficient k1 determined by the weighting coefficient decision unit 201. The buffer 204 stores the weighted demodulated symbols output by the multiplier 203. The gain multiplier 205 multiplies the demodulated symbols from the finger $100_2$ by the weighting coefficient k2 determined by the weighting coefficient decision unit 201. The buffer 206 stores the weighted demodulated symbols output by the multiplier 205. The gain multiplier 207 multiplies the demodulated symbol from the finger $100_3$ by the weighting coefficient k3 determined by the weighting coefficient decision unit 201. The buffer 208 stores the weighted demodulated symbol output by the multiplier 207.

Furthermore, the channel combiner 117 includes an adder 209, a P/S (Parallel-to-Series) converter 210, and a selector 211. The adder 209 selects fingers which are involved with the RAKE process from among the fingers $100_1$–$100_3$. Then, the adder 209 adds the outputs of the corresponding buffers at the timing defined by the timing decision unit 202. The P/S converter 210 selects fingers which are involved with the parallel demodulation process. Then, the P/S converter 210 combines, in serial formation, the weighted demodulated symbols read from the corresponding buffers at the timing defined by the timing decision unit 202. If the demodulation based on the RAKE process and the demodulation of the orthogonal channels are simultaneously used, the P/S converter 210 combines, in serial formation, the weighted demodulated symbols read from the corresponding buffers involved with the parallel demodulation and the output of the adder 209.

The selector 211 selects the output of the P/S converter 210 when the demodulated symbols of the channels are combined or the demodulation based on the RAKE process and the parallel demodulation coexist. When the demodulated symbols based on the RAKE process are combined, the selector 211 selects the output of the adder 209.

The channel combiner 117 thus configured operates as follows.

The demodulated symbols supplied from the fingers $100_1$ through $100_3$ are multiplied by the weighting coefficients k1 through k3 by the gain multipliers 203, 205 and 207, respectively. The weighting coefficient decision unit 201 determines, by referring to, for example, the receive power levels of the paths, the values of the weighting coefficients k1 through k3 which function to reduce the error ratio. The demodulated symbols with the weighting coefficients k1 through k3 multiplied are output to the buffers 204, 206 and 208, and are stored therein.

The weighted demodulated symbols thus stored are read from the buffers 204, 206 and 208 at the timing determined by the timing decision unit 202, which determines the timing on the basis of the relative delay times indicated by the searcher 118. Then, the weighted demodulated symbols are applied to the adder 209 and the P/S converter 210.

When only the demodulation based on the RAKE process is carried out, the demodulated symbols read from the buffers 204, 206 and 208 are added at the adder 209. The selector 211 selects the adder 209, so that the weighted demodulated symbols can be output to the next stage of the receiver. When only the parallel demodulation for the three orthogonal channels is carried out, the weighted demodulated symbols read from the buffers 204, 206 and 208 are serially regenerated so as to obtain the original sequence by the P/S converter 210, and are then combined in serial formation thereby. The selector 211 selects the P/S converter 210, so that the combined demodulated symbols can be output to the next stage of the receiver.

When the demodulation based on the RAKE process and the parallel demodulation (two orthogonal channels in this case) are simultaneously carried out, the demodulated symbols from the corresponding fingers involved with the RAKE process are added by the adder 209. Then, the combined demodulated symbols output by the adder 209 are output to the P/S converter 210, which combines, in serial formation, the combined demodulated symbols output by the adder 209 and the demodulated signals from the fingers.

Figure 3:
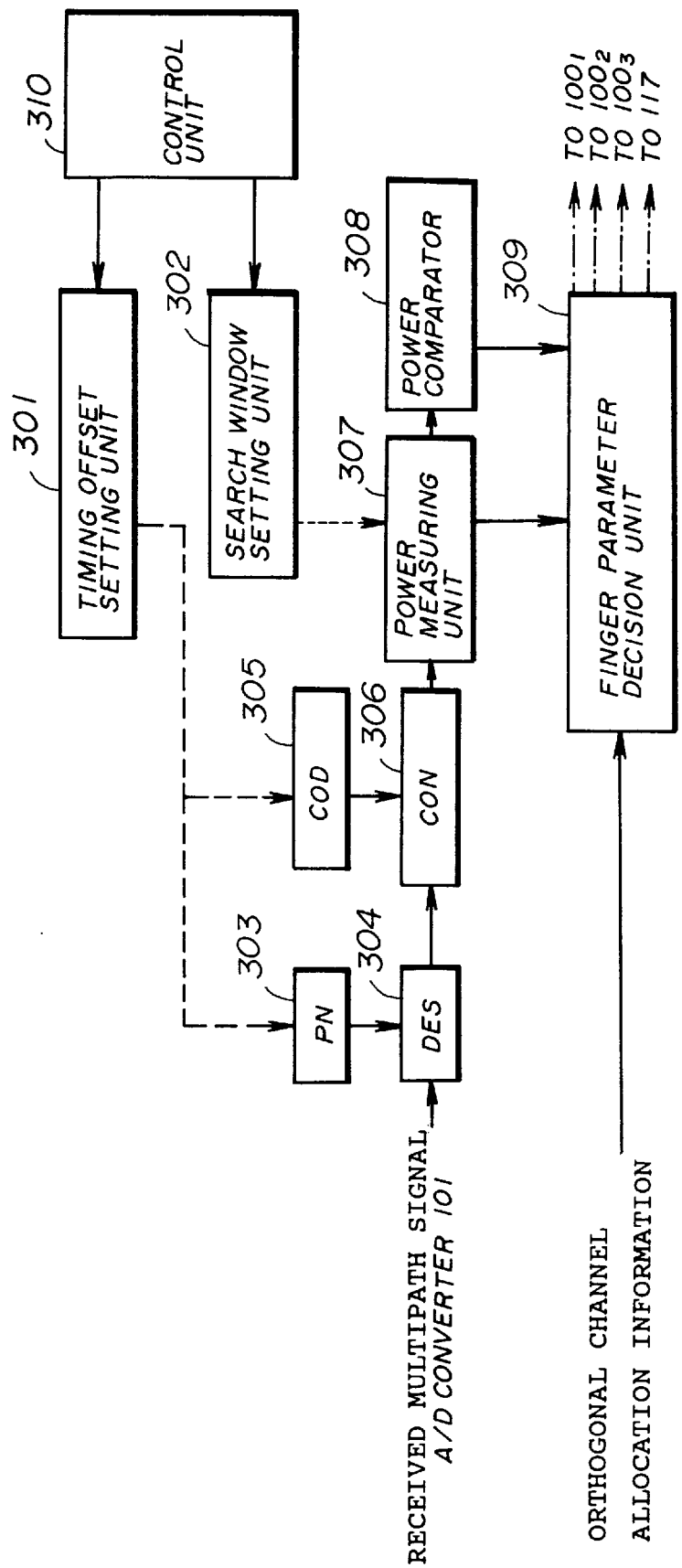
FIG. 3 is a block diagram of a searcher shown in FIG. 1.

FIG. 3 is a block diagram of the searcher 118. As shown in FIG. 3, the searcher 118 includes a timing offset setting unit 301, a search window setting unit 302, a PN generator 303, a despreader 304, an orthogonal code generator 305, an inverse-orthogonal converter 306, a power measuring unit 307, a power Comparator 308, a finger parameter decision unit 309, and a control unit 310.

The timing offset setting unit 301 sets the relative values of the timing offsets of the receiver necessary to measure the channel states. The search window setting unit 302 sets the length of a search window of the receiver necessary to measure the channel states. The PN generator 303 generates the same PN code as that of the transmitter in accordance with the phase offset (which can be referred to as a timing offset) determined by the timing offset setting unit 301. The despreader 304 despreads the RX signal from the A/D converter 101 shown in FIG. 1 by using the sequence of the PN code generated by the PN generator 303. The orthogonal code generator 305 generates, according to the phase offset determined by the timing offset setting unit 301, the orthogonal code assigned to the orthogonal channel number allocated for searching, The inverse-orthogonal converter 306 performs the inverse-orthogonal operation on the despread chips from the despreader 304 by using the orthogonal code supplied from the orthogonal code generator 305.

The power measuring unit 307 integrates the signal from the inverse-orthogonal converter 306 during the period of the search window determined by the search window setting unit 302, so that the receive power during the search window period can be obtained. The power comparator 308 compares the receive power levels measured by the power measuring unit 307 with each other, and obtains candidate paths. Then, a given number of paths is selected from among the candidate paths in the decreasing order of the receive power levels and the phase offsets respectively obtained at the time of measuring the receive power levels. The finger parameter decision unit 309 receives channel state information indicative of the receive power levels output by the power comparator 308, the phase offsets obtained at the time of measuring the receive power levels, the number of channels allocated, and the degrees of weighting for each channel. Then, the finger parameter decision unit 309 determines the phase offsets to be respectively supplied to the fingers $100_1$, $100_2$ and $100_3$ and allocates the orthogonal channel numbers. The control unit 310 controls the timing offsets and the search window in order to make it possible to appropriately measure the channel states. The parameter decision unit 309 is also supplied with the orthogonal channel allocation information sent by the transmitter.

The searcher 118 thus configured operates as follows. The RX signal from the A/D converter 101 is applied to the despreader 304, which despreads the RX signal by using the PN code which is supplied from the PN generator 303 and is the same as that allocated at the transmitter.

Then, the orthogonal code of a pilot orthogonal channel allocated to transmit a pilot signal is generated by the orthogonal code generator 305, and is supplied to the inverse-orthogonal converter 306. Then, the converter 306 performs the inverse-orthogonal conversion process on the despread chips by using the orthogonal code generated by the orthogonal code generator 305. In this case, the timing at which the PN generator 303 generates the PN code and the timing at which the orthogonal code generator 305 generates the orthogonal code are determined by the timing offset setting unit 301.

The pilot signal thus integrated is applied to the power measuring unit 307, which measures the receive power level of the pilot signal.

The timing offset setting unit 301 measures the receive power level of the pilot signal during one period of the sequence of the PN code while shifting the timing offset of the PN code. FIG. 4 shows an example of the channel states measured by the searcher 118. The timing offset of the PM code is sequentially shifted by τ1, τ2, τ3 and so on, so that the power of the pilot signal is measured for one period of the sequence of the PN code. FIG. 4 shows that a multipath signal are propagated along the isolated paths #1, #2, #3 and #4. In FIG. 4, symbols P1, P2, P3 and P4 denote the received pilot power levels of the paths #1, #2, #3 and #4, respectively. Further, τ1, τ2, τ3 denote the phase offsets with reference to the path #1. The power comparator 308 compares the receive power levels thus measured, and supplies the finger parameter decision unit 309 with information indicative the relationship P1>P2>P3>P4.

The finger parameter decision unit 309 determines a weighting parameter corresponding to the relationship of the receive power levels measured as described above, a timing parameter corresponding to the phase offsets τ1, τ2 and τ3, and a control parameter depending on the channel state information and information indicated by the user. The control parameter indicates whether the demodulation by the RAKE process or the parallel demodulation should be carried out.

The pilot signal consists of predetermined fixed data. Hence, the receive power levels of the pilot signal propagating along paths can be accurately measured by the searcher—18. Hence, it is possible to apply the channel state information obtained from the pilot signal (the channel state information includes the phase offsets and receive power levels of the paths) to other orthogonal channels.

The search window setting unit 302 sets the search window to be relatively long at the initial state of the searching process, and thereafter adjusts it to be an appropriate length based on the extent of the paths.

Figure 5:
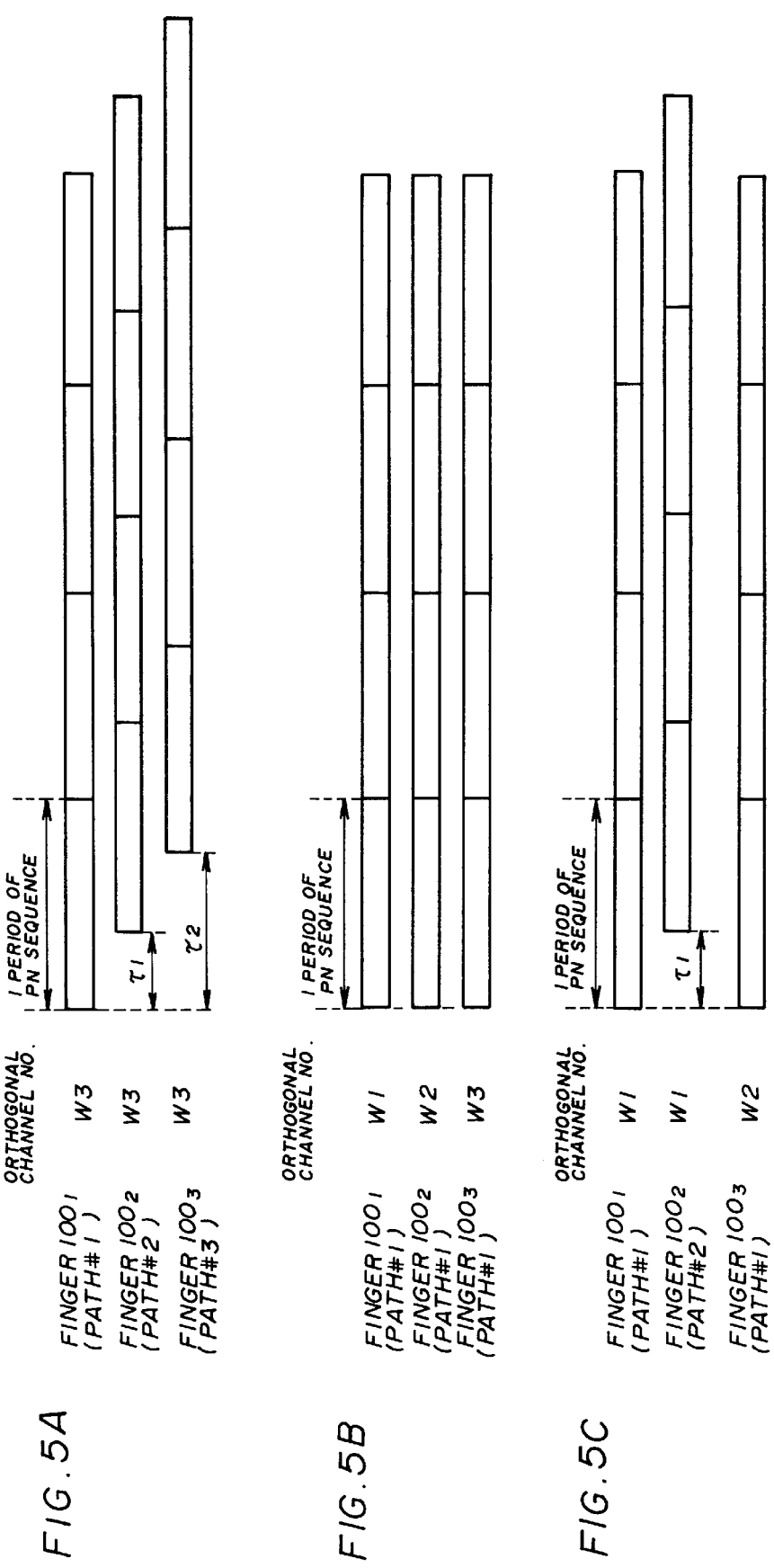
FIGS. 5A, 5B and 5C are diagrams showing finger allocation processes.

FIGS. 5A, 5B and 5C show examples of a path allocation process based on the measurement shown in FIG. 4. The path allocation process allocates to the fingers $100_1$–$100_3$ of the receiver shown in FIG. 1 the phase offsets and the orthogonal channels.

FIG. 5A shows an example of the path allocation process to be executed when the transmitter uses only one orthogonal channel having an orthogonal channel number W3. As shown in FIG. 5A, the paths #1, #2 and #3 respectively having the first, second and third greatest receive power levels are allocated to the fingers $100_1$, $100_2$ and $100_3$. The phase offsets equal to 0, τ1 and τ2 are allocated to the fingers $100_1$, $100_2$ and $100_3$, respectively. Further, the orthogonal channel W3 is allocated to the fingers $100_1$, $100_2$ and $100_3$. The fingers $100_1$, $100_2$ and $100_3$ perform the RAKE process for the orthogonal channel W3.

FIG. 5B shows an example of the path allocation process to be executed when the transmitter transmits data by using three orthogonal channels having the orthogonal channel numbers W1, W2 and W3 in parallel formation. As shown in FIG. 5B, the paths #1, #2 and #3 respectively having the first, second and third greatest receive power levels are allocated to the fingers $100_1$, $100_2$ and $100_3$. The phase offset of the path #1 having the greatest receive power level is given to the fingers $100_1$, $100_2$ and $100_3$. That is, no phase offset is given to the fingers $100_1$, $100_2$ and $100_3$. Further, the orthogonal channel numbers W1, W2 and W3 are respectively allocated to the fingers $100_1$, $100_2$ and $100_3$. Hence, the fingers $100_1$, $100_2$ and $100_3$ separately carry out the parallel demodulation for the orthogonal channels W1, W2 and W3.

FIG. 5C shows an example of the path allocation process to be executed when the transmitter allocates two orthogonal channels W1 and W2 so that the orthogonal channel W1 is heavily weighted at the transmitter, as compared to the orthogonal channel W2. The paths #1 and #2 having the first and second greatest receive power levels are allocated to the fingers $100_1$ and $100_2$, respectively. Further, the path #1 having the greatest receive power level is allocated to the finger $100_3$. More particularly, the phase offsets of the paths #1 and #2 are respectively allocated to the fingers $100_1$ and $100_2$, and the orthogonal channel number W1 is allocated thereto. The phase offset of the path #1 is allocated to the finger $100_3$, and the orthogonal channel number W2 is allocated thereto. The fingers $100_1$ and $100_2$ perform the demodulation by the RAKE process, and the fingers $100_1$ through $100_3$ perform the parallel demodulation of the orthogonal channels W1 and W2.

As described above, the searcher 118 controls the fingers $100_1$ through $100_3$ so that the orthogonal channels to be processed are dynamically allocated to the fingers on the basis of the orthogonal channel allocation information which indicates that the number of orthogonal channels allocated at the transmitter and weighting for the orthogonal channels carried out at the transmitter.

A description will now be given of a spread spectrum communication receiver according to a second embodiment of the present invention, which has a feature in which the receiver has a smaller number of fingers than the number of orthogonal channels allocated to the transmitter. As will be seen from the following, the receiver according to the second embodiment of the present invention can demodulate the received multipath signal at a higher speed than the receiver according to the first embodiment thereof.

Figure 6:
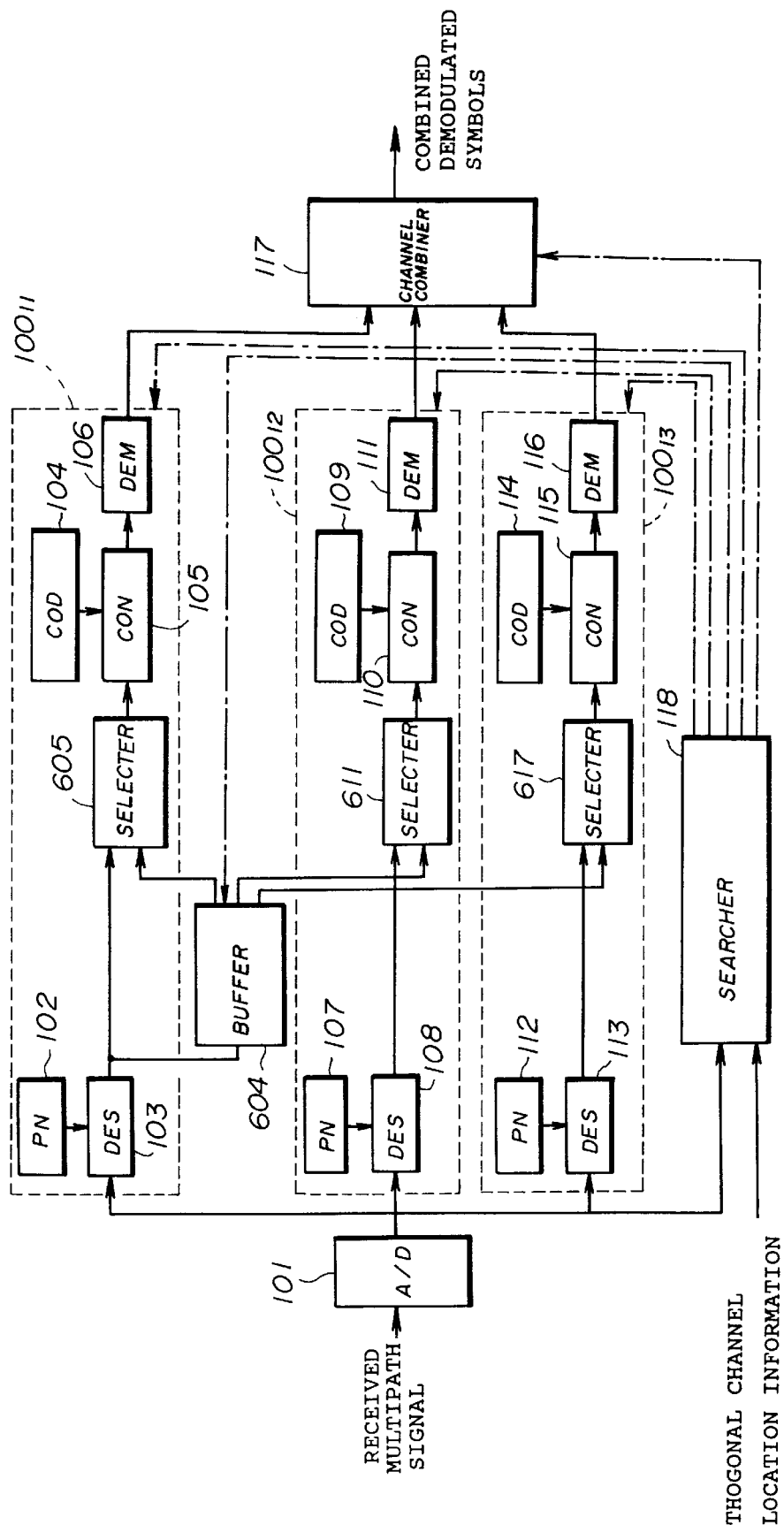
FIG. 6 is a block diagram of a spread spectrum communication receiver according to a second embodiment of the present invention.

FIG. 6 is a block diagram of the spread spectrum communication receiver according to the second embodiment of the present invention. In FIG. 6, parts that are the same as those of the first embodiment of the present invention are given the same reference numbers. The receiver shown in FIG. 6 includes three fingers $100_{11}$, $100_{12}$ and $100_{13}$. The finger $100_{11}$ has all the blocks 102 through 106 of the finger $100_1$ shown in FIG. 1. Similarly, the finger $100_{12}$ has all the blocks 107 through 111 of the finger $100_2$ shown in FIG. 1. Further, the finger $100_{13}$ has all the blocks 112 through 116 of the finger $100_3$ shown in FIG. 1.

The receiver shown in FIG. 6 further includes a buffer 604, which is not employed in the receiver shown in FIG. 1. The fingers $100_{11}$, $100_{12}$ and $100_{13}$ respectively have selectors 605, 611 and 617.

The despread signal output by the despreader 103 is written into the buffer 604, from which the despread signal is read a given number of times. The write and read operations of the buffer 604 are controlled according to the timings defined by the searcher 118. The selector 605 of the finger $100_{11}$ selects the despreader 103 when the same demodulation process as that of the receiver shown in FIG. 1 should be carried out. The selector 605 selects the buffer 604 when a high-speed demodulation should be carried out in which a larger number of orthogonal channels than the number of fingers $100_{11}$–$100_{13}$ of the receiver is allocated at the transmitter. The selected despread signal is applied to the inverse-orthogonal converter 105.

The selector 611 of the finger $100_{12}$ selects the despreader 108 when the same demodulation process as that of the receiver shown in FIG. 1 should be carried out. The selector 611 selects the buffer 604 when the high-speed demodulation should be carried out in which a larger number of orthogonal channels than the number of fingers $100_{11}$–$100_{13}$ of the receiver is allocated at the transmitter. The selected despread signal is applied to the inverse-orthogonal converter 110. The selector 617 of the finger $100_{13}$ selects the despreader 113 when the same demodulation process as that of the receiver shown in FIG. 1 should be carried out. The selector 617 selects the buffer 604 when the high-speed demodulation should be carried out in which a larger number of orthogonal channels than the number of fingers $100_{11}$–$100_{13}$ of the receiver is allocated at the transmitter. The selected despread signal is applied to the inverse-orthogonal converter 115.

A description will now be given, with reference to FIGS. 7A through 7F, of an operation of the high-speed demodulation type receiver shown in FIG. 6. FIGS. 7A through 7F are timing charts of an operation of the receiver to be executed when the receiver shown in FIG. 6 performs a high-speed demodulation. In the following description, the situation shown in FIG. 4 is referred to. It will now be assumed that six orthogonal channels are allocated at the transmitter and the orthogonal channel numbers thereof are denoted as W1, W2, W3, W4, W5 and W6. In this case, the selectors 605, 611 and 617 select the despread signal read from the buffer 604 and supply it to the respective inverse-orthogonal converters 105, 110 and 115.

Figure 7:
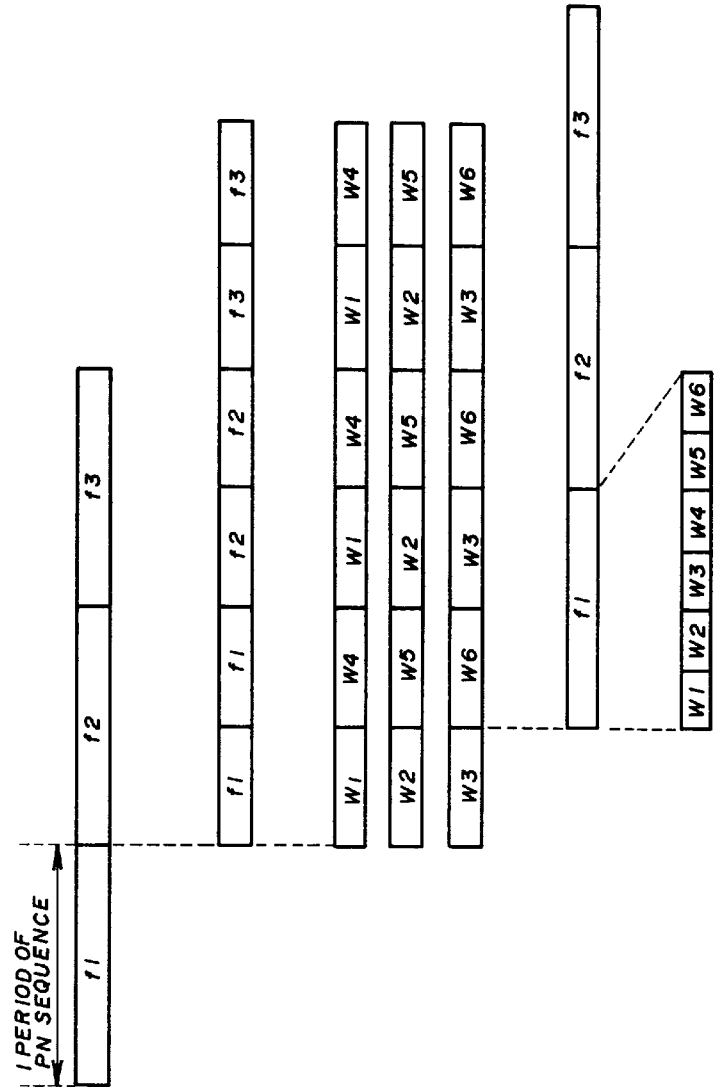
FIGS. 7A, 7B, 7C, 7D, 7E and 7F are timing charts of an operation of the spread spectrum communication receiver shown in FIG. 6.

The despread symbols output by the despreader 103 are written into the buffer 604 at the timing shown in FIG. 7A and defined by the searcher 118. In this case, the phase offset of the path #1 having the greatest received pilot power level is given to the finger $100_{11}$. The PN generator 102 generates the PN code with the given phase offset, and sends it to the despreader 103.

The despread signal amounting to one frame is written into the buffer 604 where one frame corresponds to one period of the sequence of the PN code. That is, the despread signal is written into the buffer 604 every frame, As shown in FIG. 7A, frames f1, f2 and f3 of the despread signal are serially written into the buffer 604 in this order.

The despread signal stored in the buffer 604 is read therefrom twice for each frame, as shown in FIG. 7B. The above read operation is carried out in synchronism with a clock signal having a frequency equal to twice the chip rate of the PN code. That is, the same frame is successively read from the buffer 604 twice during one period of the sequence of the PN code. The buffer 604 is formed of, for example, a dual-port memory allowing data to be simultaneously written therein and read therefrom.

The despread signal read from the buffer 604 every frame is supplied to the inverse-orthogonal converters 105, 110 and 115 of the fingers $100_{11}$, $100_{12}$ and $100_{13}$. In this case, the orthogonal code generator 104 of the finger $100_{11}$ is informed of the orthogonal channel number W1 during the first half of the period of the PN code sequence and is informed of the orthogonal channel number W4 during the second half thereof. The orthogonal codes corresponding to the orthogonal channel numbers W1 and W4 are output to the inverse-orthogonal converter 105 during the first and second halves of one period of the PN code sequence, respectively. Hence, as shown in FIG. 7C, the inverse-orthogonal converter 105 alternately performs the inverse-orthogonal conversion processes for the signals transmitted using the orthogonal channels W1 and W4 in synchronism with the clock signal having a frequency equal to twice the chip rate of the PN code.

The orthogonal code generator 107 of the finger $100_{12}$ is informed of the orthogonal channel number W2 during the first half of the period of the PN code sequence and is informed of the orthogonal channel number W5 during the second half thereof. The orthogonal codes corresponding to the orthogonal channel numbers W2 and W5 are output to the inverse-orthogonal converter 110 during the first and second halves of one period of the PN code sequence, respectively. Hence, as shown in FIG. 7D, the inverse-orthogonal converter 110 alternately performs the inverse-orthogonal conversion processes for the signals transmitted using the orthogonal channels W2 and W5.

The orthogonal code generator 114 of the finger $100_{13}$ is informed of the orthogonal channel number W3 during the first half of the period of the PN code sequence and is informed of the orthogonal channel number W6 during the second half thereof. The orthogonal codes corresponding to the orthogonal channel numbers W3 and W6 are output to the inverse-orthogonal converter 115 during the first and second halves of one \period of the PN code sequence, respectively. Hence, as shown in FIG. 7E, the inverse-orthogonal converter 115 alternately performs the inverse-orthogonal conversion processes for the signals transmitted using the orthogonal channels W3 and W6 in synchronism with the clock signal having a frequency equal to twice the chip rate of the PN code.

The demodulated symbols of the orthogonal channels W1 through W6 processed as shown in FIGS. 7C through 7E are output to the channel combiner 117, which combines the demodulated symbols. In this case, as shown in FIG. 7F, the demodulated symbols from the fingers $100_{11}$ through $100_{13}$ are serially combined in the order of W1, W2, W3, W4, W5 and W6 in synchronism with a clock signal having a frequency equal to six times the chip rate of the PN code.

In the above-mentioned manner, it is possible to obtain combined demodulated symbols of all the channels even though there are many more channels than the fingers of the receiver.

It is to be noted that the receiver shown in FIG. 6 can operate in the same manner as the receiver shown in FIG. 1.

A description will now be given of a spread spectrum communication receiver according to a third embodiment of the present invention, which has a feature in which the receiver has a smaller number of fingers than the number of orthogonal channels allocated to the transmitter. As will be seen from the following, the receiver according to the third embodiment of the present invention can perform highly reliable demodulation as compared with the receiver of the first embodiment of the present invention.

Figure 8:
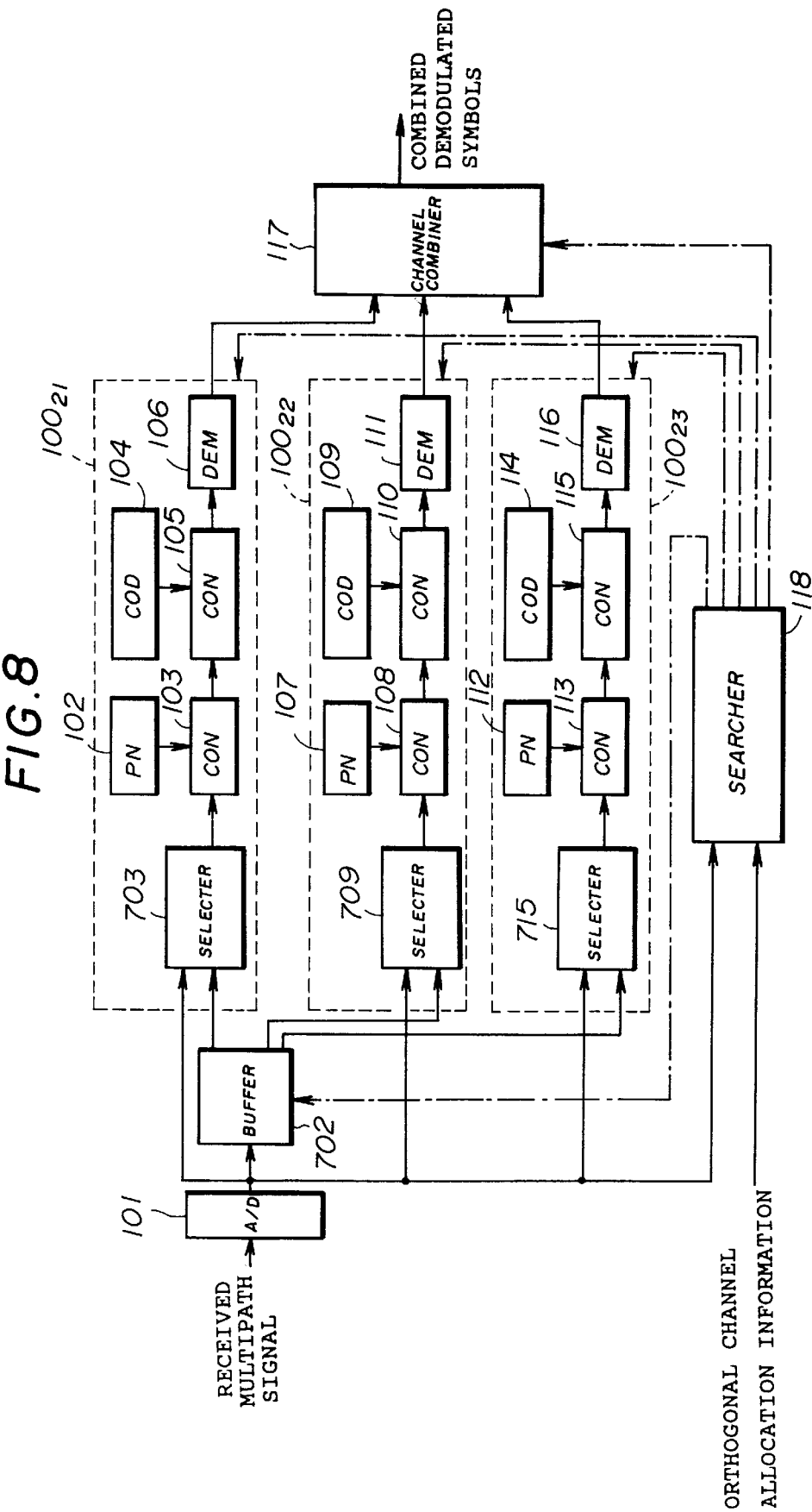
FIG. 8 is a block diagram of a spread spectrum communication receiver according to a third embodiment of the present invention.

FIG. 8 is a block diagram of the spread spectrum communication receiver according to the third embodiment of the present invention. In FIG. 8, parts that are the same as those of the first embodiment of the present invention are given the same reference numbers. The receiver shown in FIG. 8 includes three fingers $100_{21}$, $100_{22}$ and $100_{23}$. The finger $100_{21}$ has all the blocks 102 through 106 of the finger $100_1$ shown in FIG. 1. Similarly, the finger $100_{22}$ has all the blocks 107 through 111 of the finger $100_2$ shown in FIG. 1. Further, the finger $100_{23}$ has all the blocks 112 through 116 of the finger $100_3$ shown in FIG. 1.

The receiver shown in FIG. 8 further includes a buffer 702, which is not employed in the receiver shown in FIG. 1. The fingers $100_{21}$, $100_{22}$ and $100_{23}$ respectively have selectors 703, 709 and 715.

The RX signal output by the A/D converter 101 is written into the buffer 702, from which the written RX signal is read a given number of times. The write and read operations of the buffer 702 are controlled according to the timings defined by the searcher 118. The selector 703 of the finger $100_{11}$ selects the A/D converter 101 when the same demodulation process as that of the receiver shown in FIG. 1 should be carried out. The selector 703 selects the buffer 702 when a highly reliable demodulation should be carried out in which a larger number of orthogonal channels than the number of fingers $100_{21}$–$100_{23}$ of the receiver is allocated at the transmitter. The selected digital signal is applied to the despreader 103.

The selector 709 of the finger $100_{22}$ selects the A/D converter 101 when the same demodulation process as that of the receiver shown in FIG. 1 should be carried out. The selector 709 selects the buffer 702 when the highly reliable demodulation should be carried out in which a larger number of orthogonal channels than the number of fingers $100_{21}$–$100_{23}$ of the receiver is allocated at the transmitter. The selected digital signal is applied to the despreader 108. The selector 715 of the finger $100_{23}$ selects the A/D converter 101 when the same demodulation process as that of the receiver shown in FIG. 1 should be carried out. The selector 715 selects the buffer 702 when the highly reliable demodulation should be carried out in which a larger number of orthogonal channels than the number of fingers $100_{21}$–$100_{23}$ of the receiver is allocated at the transmitter. The selected digital signal is applied to the despreader 113.

A description will now be given, with reference to FIGS. 9A through 9F, of an operation of the high-speed demodulation type receiver shown in FIG. 8. FIGS. 9A through 9F are timing charts of an operation of the receiver to be executed when the receiver shown in FIG. 8 performs highly reliable demodulation. In the following description, the situation shown in FIG. 4 is referred to. It will now be assumed that six orthogonal channels are allocated at the transmitter and the orthogonal channel numbers thereof are denoted as W1, W2, W3, W4, W5 and W6. In this case, the selectors 703, 709 and 715 select the RX signal read from the buffer 702 and supply it to the despreaders 103, 108 and 113.

Figure 9:
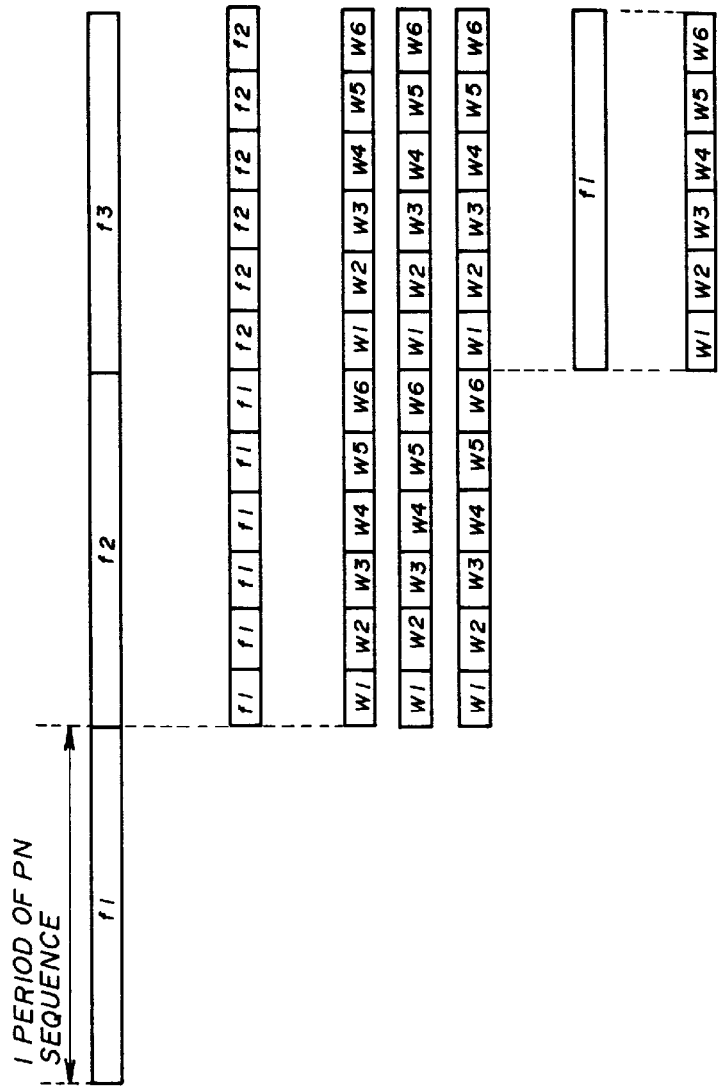
FIGS. 9A, 9B, 9C, 9D, 9E and 9F are timing charts of an operation of the spread spectrum communication receiver shown in FIG. 8.

The RX signal output by the A/D converter 101 is written into the buffer 702 at the timing shown in FIG. 9A and defined by the searcher 118. In this case, the RX signal amounting to one frame is written into the buffer 702 where one frame corresponds to one period of the sequence of the PN code, as has been described previously. That is, the Rx signal from the A/D converter 101 is written into the buffer 702 every frame. As shown in FIG. 9A, frames f1, f2 and f3 of the RX signal are serially written into the buffer 702 in this order.

The RX signal stored in the buffer 702 is read therefrom six times for each frame, as shown in FIG. 97B. The above read operation is carried out in synchronism with a clock signal having a frequency equal to six times the chip rate of the PN code. That is, the same frame is successively read from the buffer 702 six times during one period of the sequence of the PN code. The buffer 702 is formed of, for example, a dual-port memory allowing data to be simultaneously written therein and read therefrom.

The RX signal read from the buffer 702 every frame is output to the despreaders 103, 108 and 113 of the fingers $100_{21}$, $100_{22}$ and $100_{23}$. In this case, the finger $100_{21}$ is given the phase offset of the path #1 having the greatest receive power level. The PN generator 102 generates the PN code with the given phase offset, and sends it to the despreader 103. The finger $100_{22}$ is given the phase offset of the path #2 having the second greatest receive power level. The PN generator 107 generates the PN code with the given phase offset, and sends it to the despreader 108. The finger $100_{23}$ is given the phase offset of the path #3 having the third greatest receive power level. The PN generator 113 generates the PN code with the given phase offset, and sends it to the despreader 113.

Each of the orthogonal code generators 104, 109 and 114 of the fingers $100_{21}$, $100_{22}$ and $100_{23}$ is informed of the orthogonal channel numbers W1, W2, W3, W4, W5 and W6 in this order during one period of the sequence of the PN code. Thus, each of the orthogonal code generators 104, 109 and 114 serially generates the orthogonal codes of the channel numbers W1 through W6 in this order during one period of the sequence of the PN code.

As shown in FIG. 9C, the despreader 103 and the inverse-orthogonal converter 105 of the finger $100_{21}$ serially perform the respective processes for the channel signals serially transmitted by using the orthogonal channels W1 through W6 and propagated along the path #1 in synchronism with the clock signal having a frequency equal to six times the chip rate of the PN code.

As shown in FIG. 9D, the despreader 108 and the inverse-orthogonal converter 110 of the finger $100_{22}$ serially perform the respective processes for the channel signals serially transmitted by using the orthogonal channels W1 through W6 and propagated along the path #2 in synchronism with the clock signal having a frequency equal to six times the chip rate of the PN code.

As shown in FIG. 9E, the despreader 113 and the inverse-orthogonal converter 115 of the finger $100_{23}$ serially perform the respective processes for the channel signals serially transmitted by using the orthogonal channels W1 through W6 and propagated along the path #3 in synchronism with the clock signal having a frequency equal to six times the chip rate of the PN code.

The demodulated symbols of the orthogonal channels W1 through W6 obtained by the RAKE process carried out as shown in FIGS. 9C through 9E are supplied to the channel combiner 117, which serially combines the demodulated symbols, as shown in FIG. 9F. In this process, the demodulated symbols output by the fingers $100_{21}$, $100_{22}$ and $100_{23}$ can be weighted appropriately. Finally, the combined demodulated symbols are serially output from the channel combiner in the order of W1, W2, W3, W4, W5 and W6 in synchronism with the clock signal having a frequency equal to six times the chip rate of the sequence of the PN code.

In the above-mentioned manner, it is possible to highly reliably obtain demodulated symbols of all the channels even though there are many more channels than the fingers of the receiver.

It is to be noted that the receiver shown in FIG. 8 can operate in the same manner as the receiver shown in FIG. 1.

A description will now be given, with reference to FIG. 10, of a transmitter which transmits data on the basis of the bit rate of the transmitted data which can be used in the spread spectrum communication system. A selector 800 functions to output input data to one of modulator units $820_1$, $820_2$ and $820_3$ when the input data should be transmitted using one orthogonal channel. When the input data should be transmitted using two or more orthogonal channels (parallel modulation), the selector 800 sequentially outputs the input data to two ore more modulator units from among the modulator units $820_1$ through $820_3$. For example, if the input data has a bit rate which cannot be transmitted using one orthogonal channel, two or more orthogonal channels are allocated. The input data is segmented to blocks each having a fixed length, and the blocks are sequentially output, one block by one block, to the modulator units to be used.

The modulator unit $820_1$ has a modulator (MOD) 801, a multiplier (orthogonal code converter) 802 and an amplifier 806, The modulator 801 modulates the input data. The modulated data signal from the modulator 801 is multiplied by an orthogonal code C1, so that the modulated signal is subjected to the orthogonal conversion. The amplifier 806 weights the output signal of the multiplier 802. The other modulator units $820_2$ and $820_3$, which are supplied with orthogonal codes C2 and C3, respectively, have the same configuration as the modulator unit 8201.

The transmitter further includes a modulator unit $820_0$, which includes a multiplier 803 and an amplifier 807. The pilot signal is subjected to the orthogonal conversion process using an orthogonal code C0 by the multiplier 803. The output signal of the multiplier 803 is weighted by the amplifier 807.

A combiner 804 combines the input data which has been subjected to the orthogonal conversion process by the modulator units $820_1$ through $820_3$ and the pilot signal which has been subjected to the orthogonal conversion process by the modulator unit $820_0$. A spreader (SPR) 805 performs a spectrum spreading process for the output signal of the combiner 804 by using the PN code. The output data from the spreader 805 is then subjected to a QPSK modulation or the like and is transmitted.

A controller 830 detects the bit rate of the input data and controls the selector 800 as follows. When the input data has a bit rate that can be transmitted by using one orthogonal channel, the input data is supplied to one of the modulator units $820_1$ through $820_3$ via the selector 800. If the input data has a bit rate that requires use of a plurality of orthogonal channels, the input data is sequentially supplied to two or three modulator units via the selector 800 so that parallel modulation processes are carried out. The orthogonal channel allocation information indicative of the above allocation of orthogonal channels can be transmitted in the conventional manner. For example, the orthogonal channel allocation information is added to the beginning part of the transmitted signal.

Figure 10:
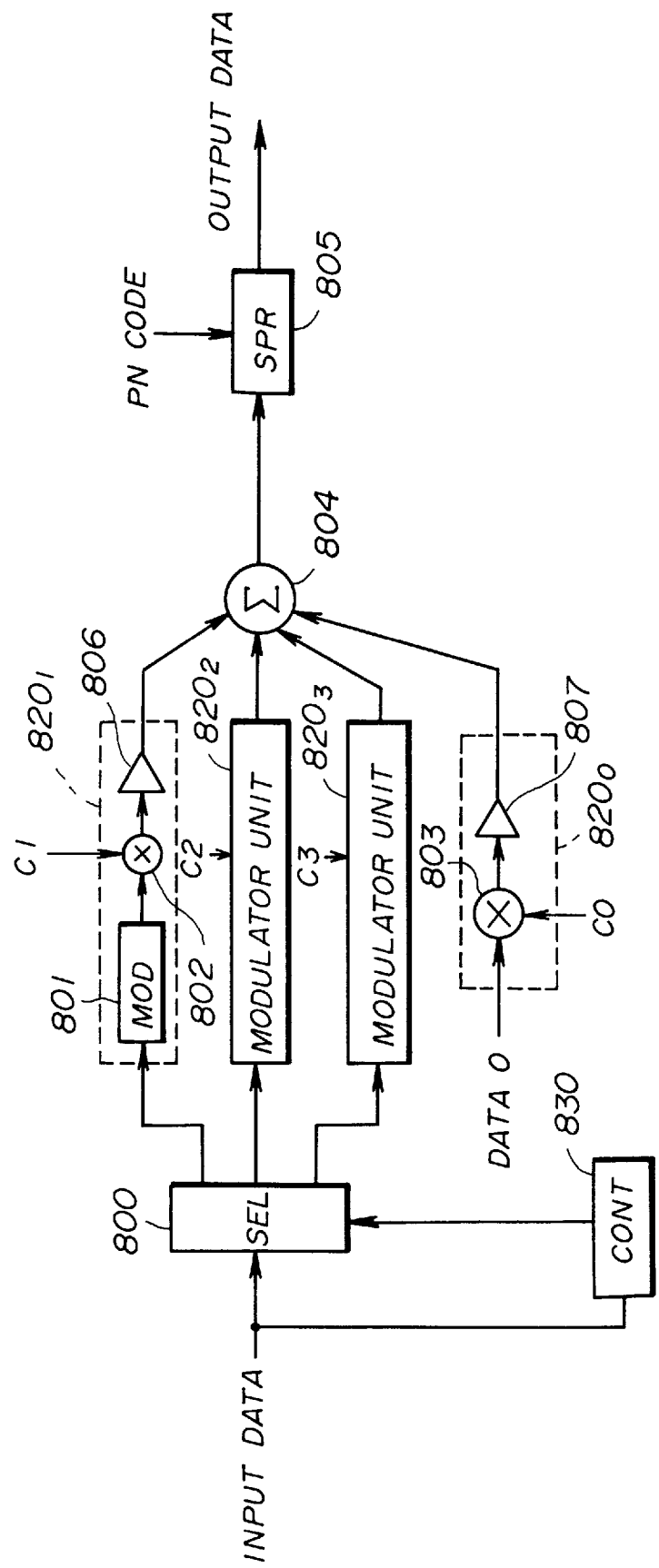
FIG. 10 is a block diagram of a spread spectrum communication transmitter which can be used in the spread spectrum communication system.

The aforementioned receiver of the present invention and the transmitter shown in FIG. 10 form a radio communication system.

In the aforementioned embodiments of the present invention, the PN code has a period of, for example, a few milliseconds. The orthogonal codes can be formed by using, for example, the Walsh function. The receiver is not limited to three fingers, but can have an arbitrary number of fingers. The transmitter is not limited to three modulator units, but can have an arbitrary number of modulator units.

Finally, a portable communication device using the present invention will be described with reference to FIG. 11.

Figure 11:
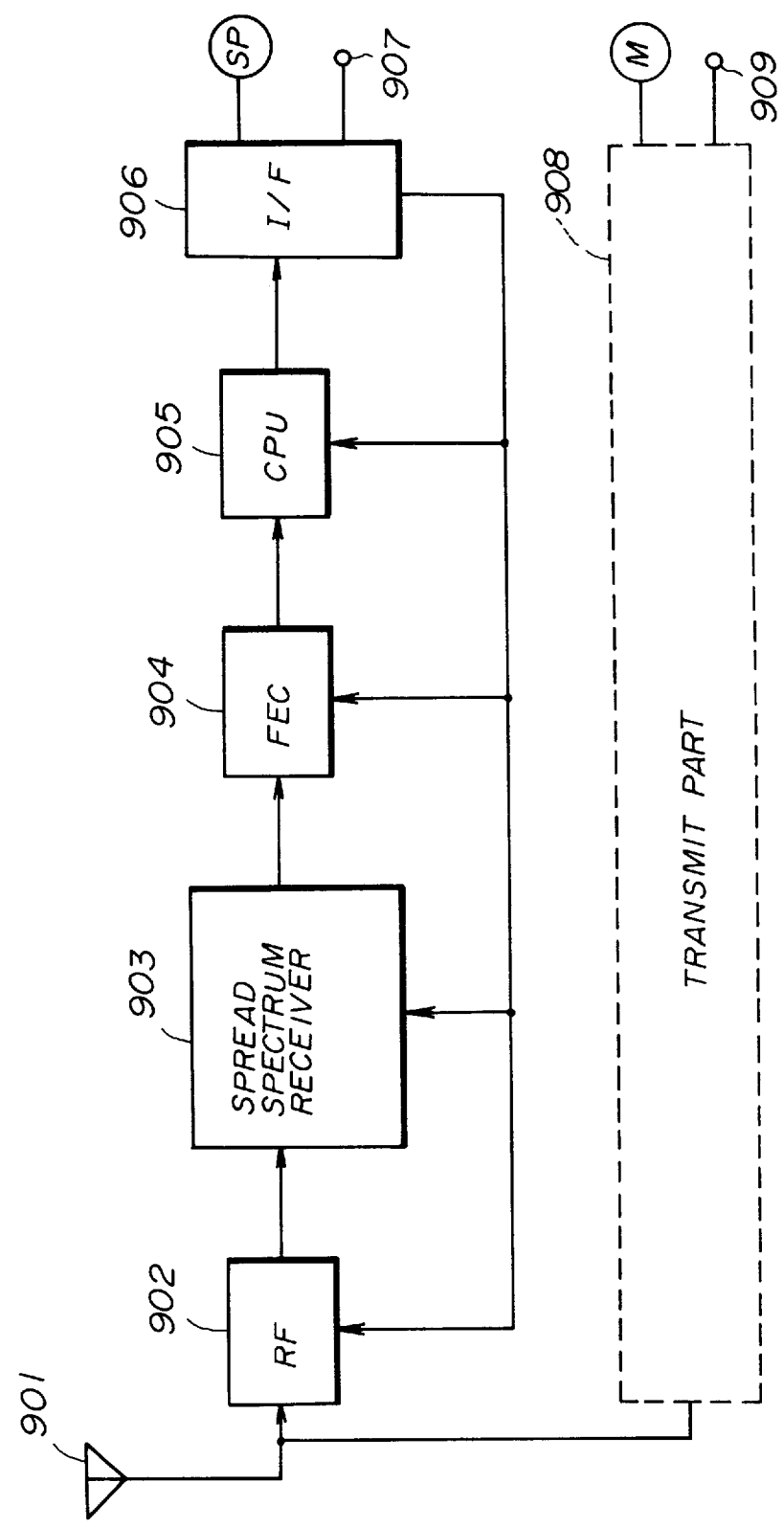
FIG. 11 is a block diagram of a portable communication device equipped with the spread spectrum communication receiver according to the present invention.

The portable communication device shown in FIG. 11 has the speed communication function and data communication function. A receive part of the portable communication device includes an antenna 901, an RF module 902, a spread spectrum receiver 903, a forward error correction unit (FEC) 904, a CPU 905, an interface unit (I/F) 906, a speaker SP and a data output terminal 907. The spread spectrum receiver 903 is configured according to the present invention as has been described previously. The forward error correction unit 904 preforms a forward error correction process for the demodulated signal (symbols) from the receiver 903. The CPU 905 performs a speech/data process for the signal from the forward error correction unit 904. The decoded speech signal is output via the interface unit 906 to the speaker, and the decoded data is output to the data output terminal 907.

A speech signal to be transmitted and data applied to a data input terminal 909 are applied to a transmit part 908, which executes a conventional transmission process. A radio wave produced by the transmit part 908 is applied to the antenna 901.

The present invention is not limited to the specifically disclosed embodiments, and variations and modifications may be made without departing from the scope of the present invention.

What is claimed is:

1. A spread spectrum communication receiver comprising:
    a plurality of fingers each including a despreader part, an inverse-orthogonal conversion part and a symbol demodulation part;
    a channel combining part which combines respective demodulated symbols of the plurality of fingers; and
    a control part which controls the plurality of fingers on the basis of channel state information and orthogonal channel allocation information so that the fingers execute a RAKE process when the orthogonal channel allocation information indicates that data to be transmitted is allocated to one orthogonal channel at a transmitter and the fingers perform parallel demodulation processes when the orthogonal channel allocation information indicates that data to be transmitted is allocated to a plurality of orthogonal channels at the transmitter.

2. The spread spectrum communication receiver as claimed in claim 1, wherein the control part controls the plurality of fingers so that the fingers simultaneously perform the RAKE process in addition to the parallel demodulation processes when the orthogonal channel allocation information indicates that data to be transmitted is allocated to a plurality of orthogonal channels at the transmitter.

3. The spread spectrum communication receiver as claimed in claim 1, wherein the control part controls the plurality of fingers so that the orthogonal channels to be processed are dynamically allocated to the fingers on the basis of the orthogonal channel allocation information which indicates the number of orthogonal channels allocated at the transmitter and weighting for the orthogonal channels allocated at the transmitter.

4. The spread spectrum communication receiver as claimed in claim 2, wherein the channel combiner combines the demodulated symbols of the fingers so that the demodulated symbols of the fingers obtained by the RAKE process are added to generate combined demodulated symbols, and the demodulated symbols of the fingers obtained by the parallel demodulation processes and the combined demodulated symbols obtained by the RAKE process are then combined in serial formation.

5. The spread spectrum communication receiver as claimed in claim 4, wherein the channel combiner combines the demodulated symbols of the fingers so that the demodulated symbols of the fingers obtained by the RAKE process are adjusted on the basis of the channel state information so as to have an identical timing and are then added to generate the combined demodulated symbols.

6. The spread spectrum communication receiver as claimed in claim 4, wherein:
    the plurality of fingers respectively have spreading code generators and orthogonal code generators;
    the spreading code generators respectively provided for despread parts of the fingers generate spreading codes with respective phase offsets dependent on the channel state information; and
    the orthogonal code generators respectively provided for the inverse-orthogonal conversion parts of the fingers generate a same orthogonal code as that allocated at the transmitter when the fingers perform the RAKE process and respective orthogonal codes when the fingers perform the parallel demodulation process.

7. A spread spectrum communication receiver comprising:
    a plurality of fingers each including a despreader part, an inverse-orthogonal conversion part and a demodulation part;
    a channel combining part which combines demodulated symbols of the plurality of fingers;
    a memory which stores a despread signal obtained by despreading a signal propagated through a path having a greatest receive power level; and
    a control part which controls the memory and the plurality of fingers so that the despread signal is read from the memory and is applied to the plurality of fingers, which fingers perform parallel demodulation processes a plurality of times within a period of a spreading code applied to the despreader part, whereby all orthogonal channels allocated at a transmitter can be demodulated within the period of the spreading code.

8. The spread spectrum communication receiver as claimed in claim 7, wherein the control part controls the memory and the plurality of fingers so that the fingers simultaneously perform the parallel demodulation processes on mutually different orthogonal channels.

9. The spread spectrum communication receiver as claimed in claim 7, wherein the control part controls the memory so that the despread signal is repeatedly read from the memory a given number of times which enables all the orthogonal channels allocated at the transmitter to be demodulated within the period of the spreading code by the parallel demodulation processes.

10. The spread spectrum communication receiver as claimed in claim 7, wherein the number of orthogonal channels allocated at the transmitter is greater than the number of the fingers.

11. A spread spectrum communication receiver comprising:
a memory which stores a received multipath signal;
a plurality of fingers, coupled to said memory, each including a despreader part, an inverse-orthogonal conversion part and a demodulation part;
a channel combining part which combines demodulated symbols of the plurality of fingers; and
a control part which controls the memory and the plurality of fingers so that the multipath signal is read from the memory and is applied to the plurality of fingers, which fingers perform a RAKE process a plurality of times within a period of a spreading code applied to the despreader part, whereby all orthogonal channels allocated at a transmitter can be demodulated by the RAKE process within the period of the spreading code.

12. The spread spectrum communication receiver as claimed in claim 11, wherein the control part controls the memory and the plurality of fingers so that the fingers perform the RAKE process on all the orthogonal channels allocated at the transmitter within the period of the spreading code.

* * * * *

UNITED STATES PATENT AND TRADEMARK OFFICE
CERTIFICATE OF CORRECTION

PATENT NO.   : 5,889,815
DATED        : March 30, 1999
INVENTOR(S)  : Naohiko IWAKIRI It is certified that error appears in the above-indentified patent and that said Letters Patent is hereby corrected as shown below:

On the title page:

Section [73]     Insert the second Assignee as follows:
                 SONY CORPORATION, Japan Signed and Sealed this Twentieth Day of March, 2001

Attest:

NICHOLAS P. GODICI

*Attesting Officer*     *Acting Director of the United States Patent and Trademark Office*